March 9, 1943.  J. R. IOANNILLI ET AL  2,313,148
ASSEMBLING MACHINE
Filed April 11, 1941  9 Sheets-Sheet 4
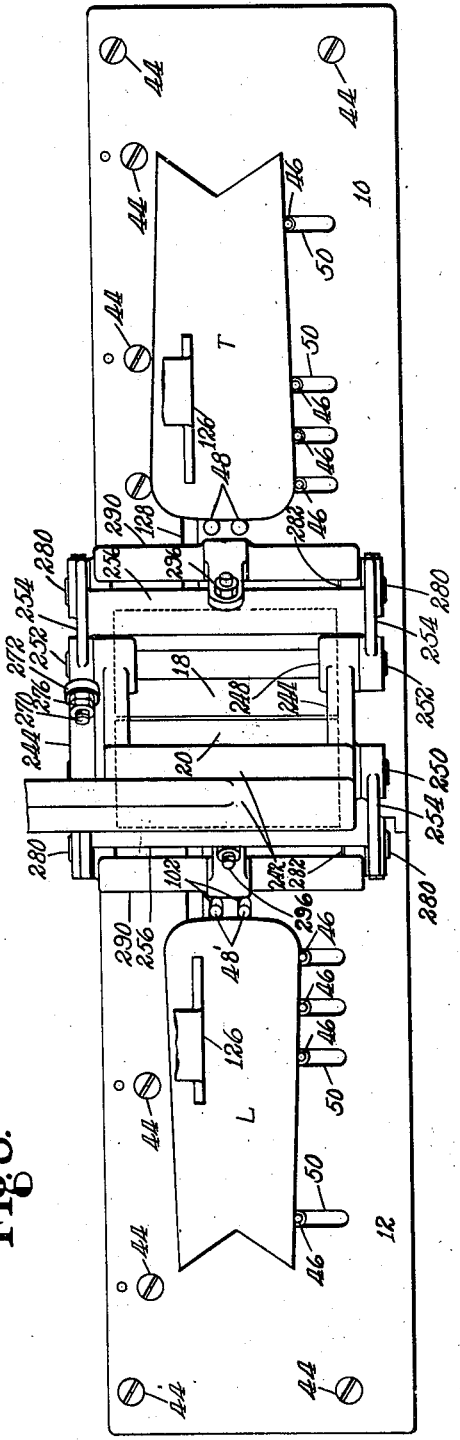
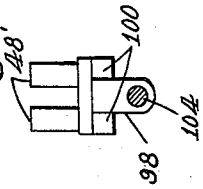
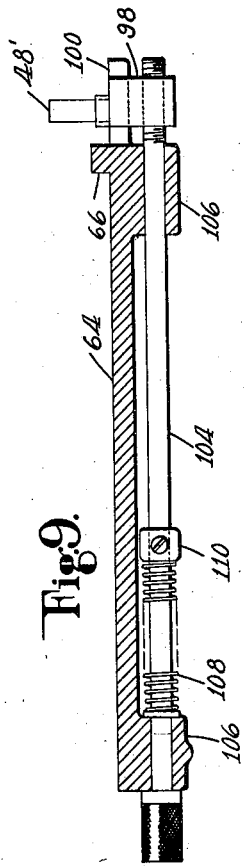
INVENTORS.
Joseph R. J. Ioannilli
Paul H. Dixon
By their Attorney
Frederick L. Emmons

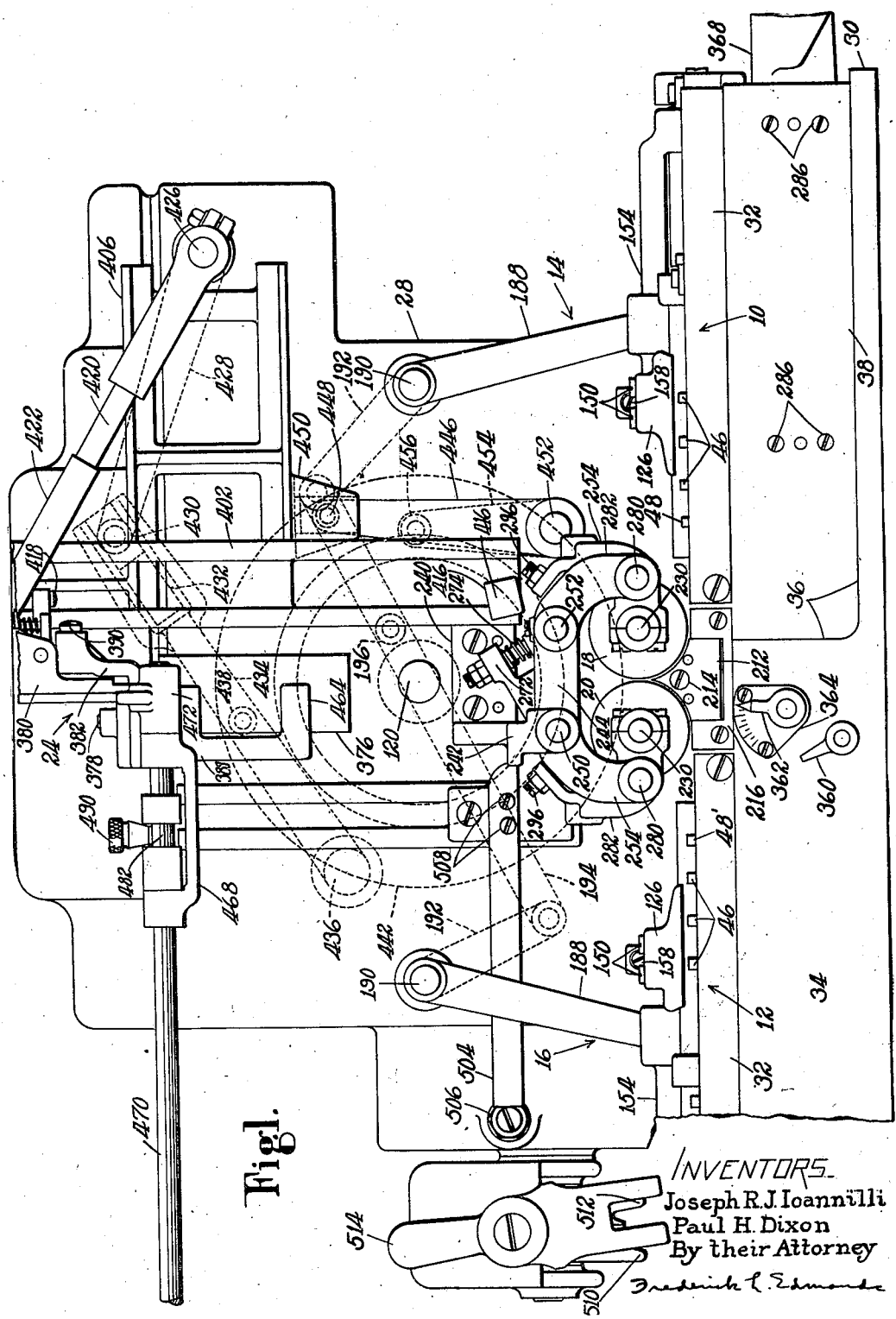

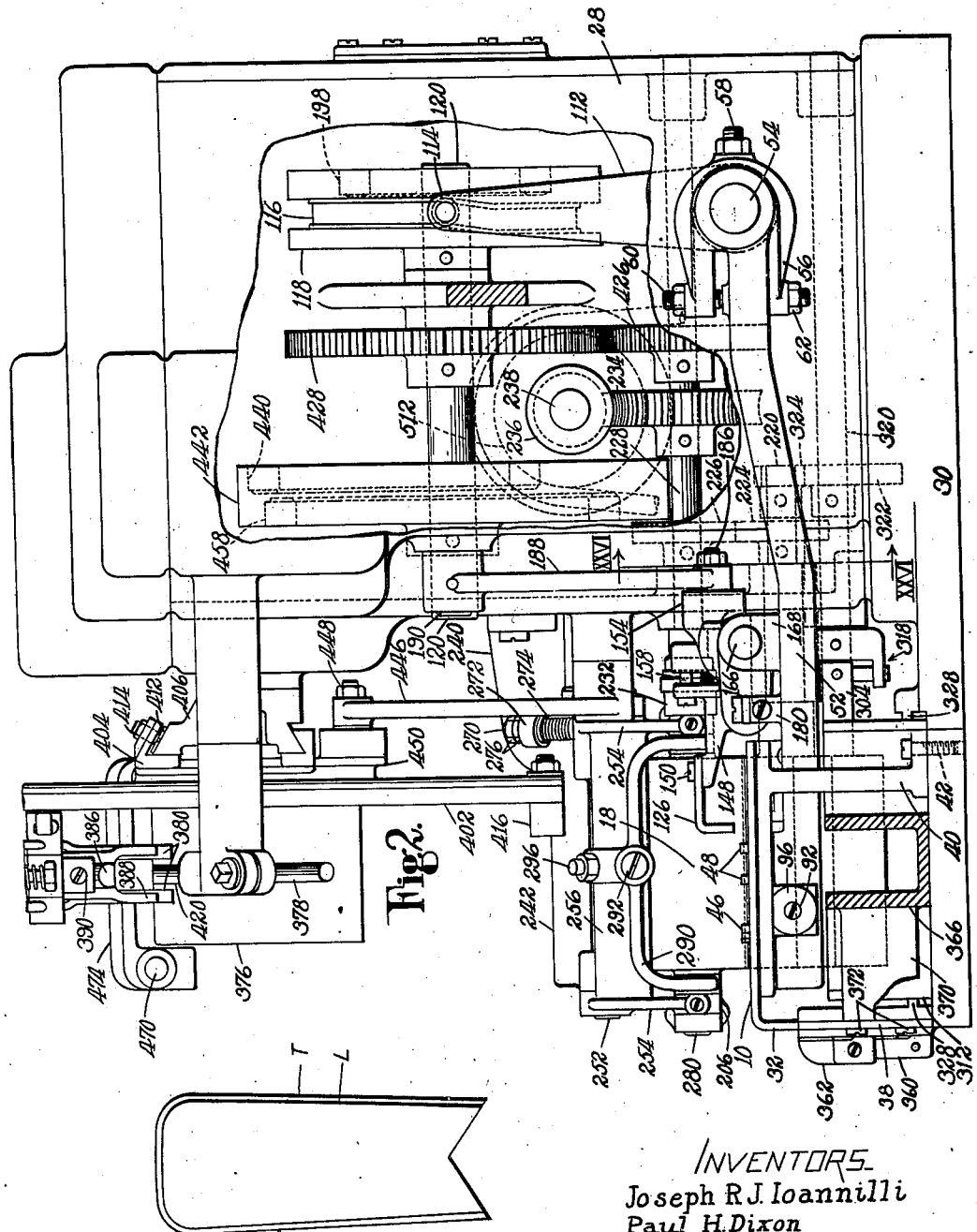

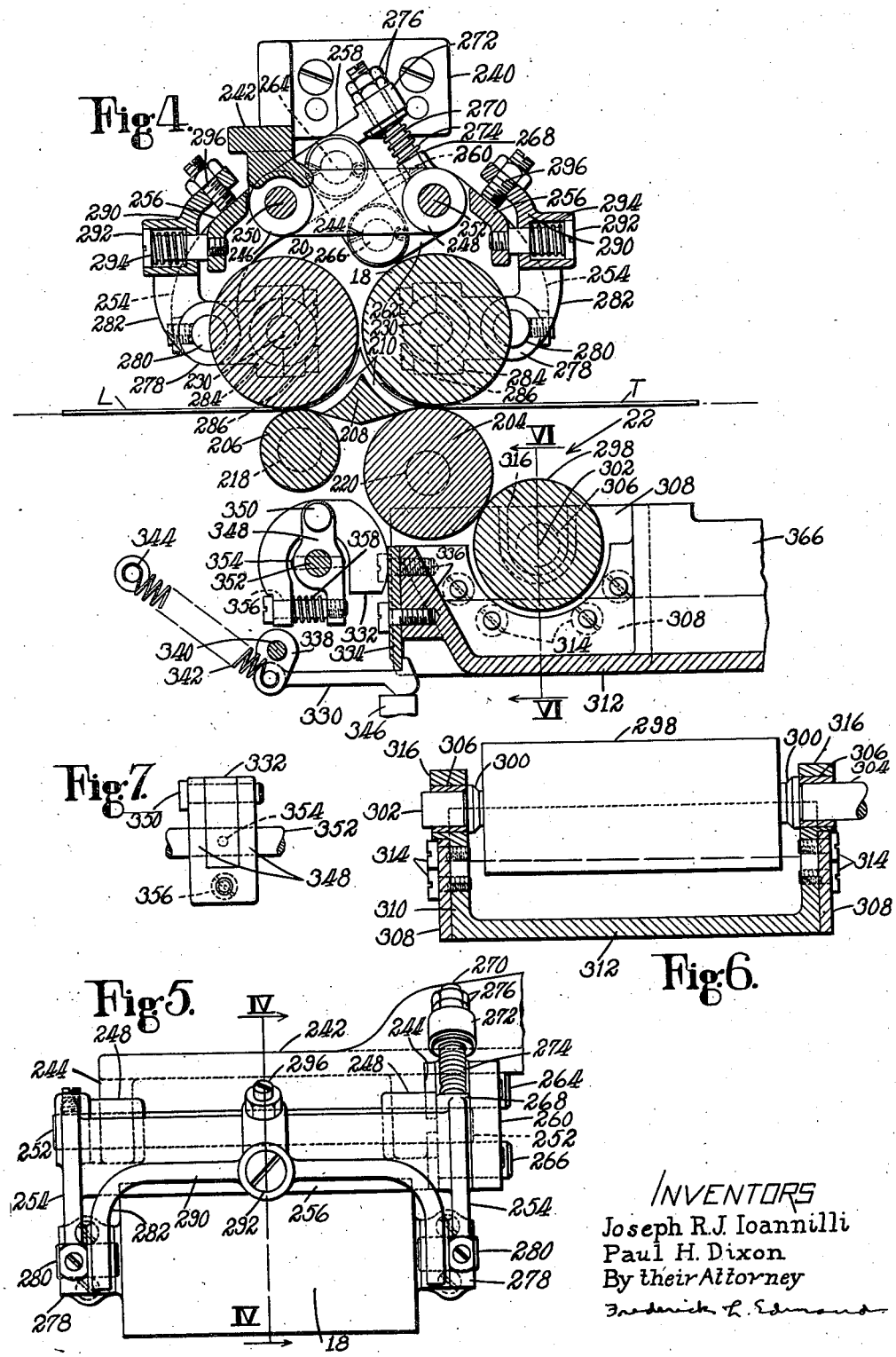

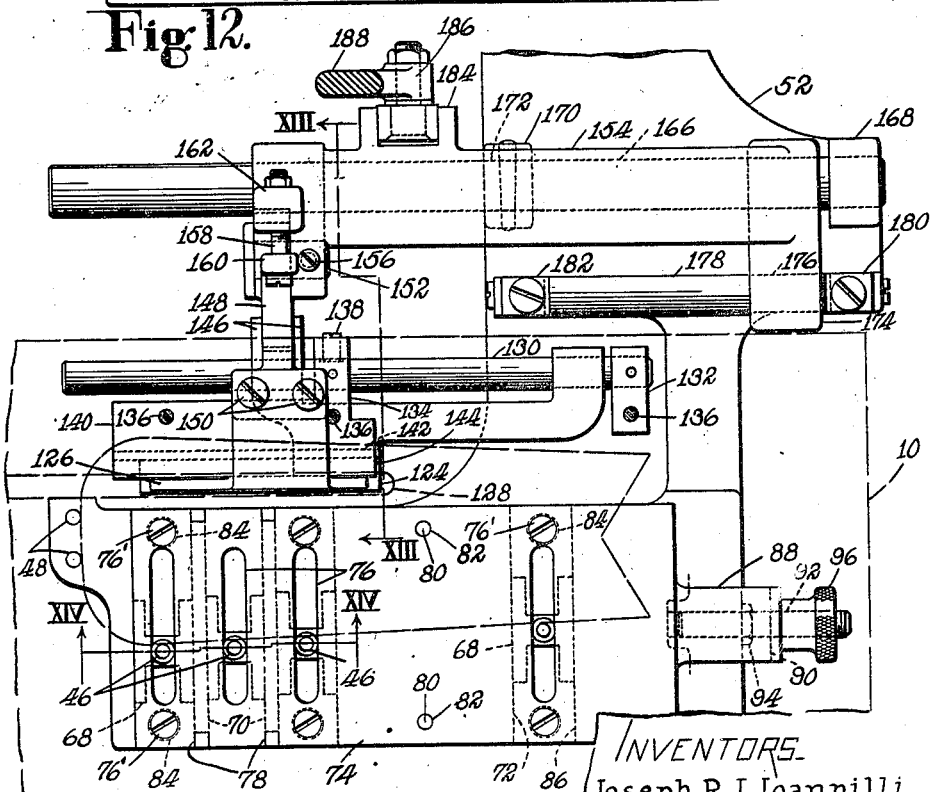

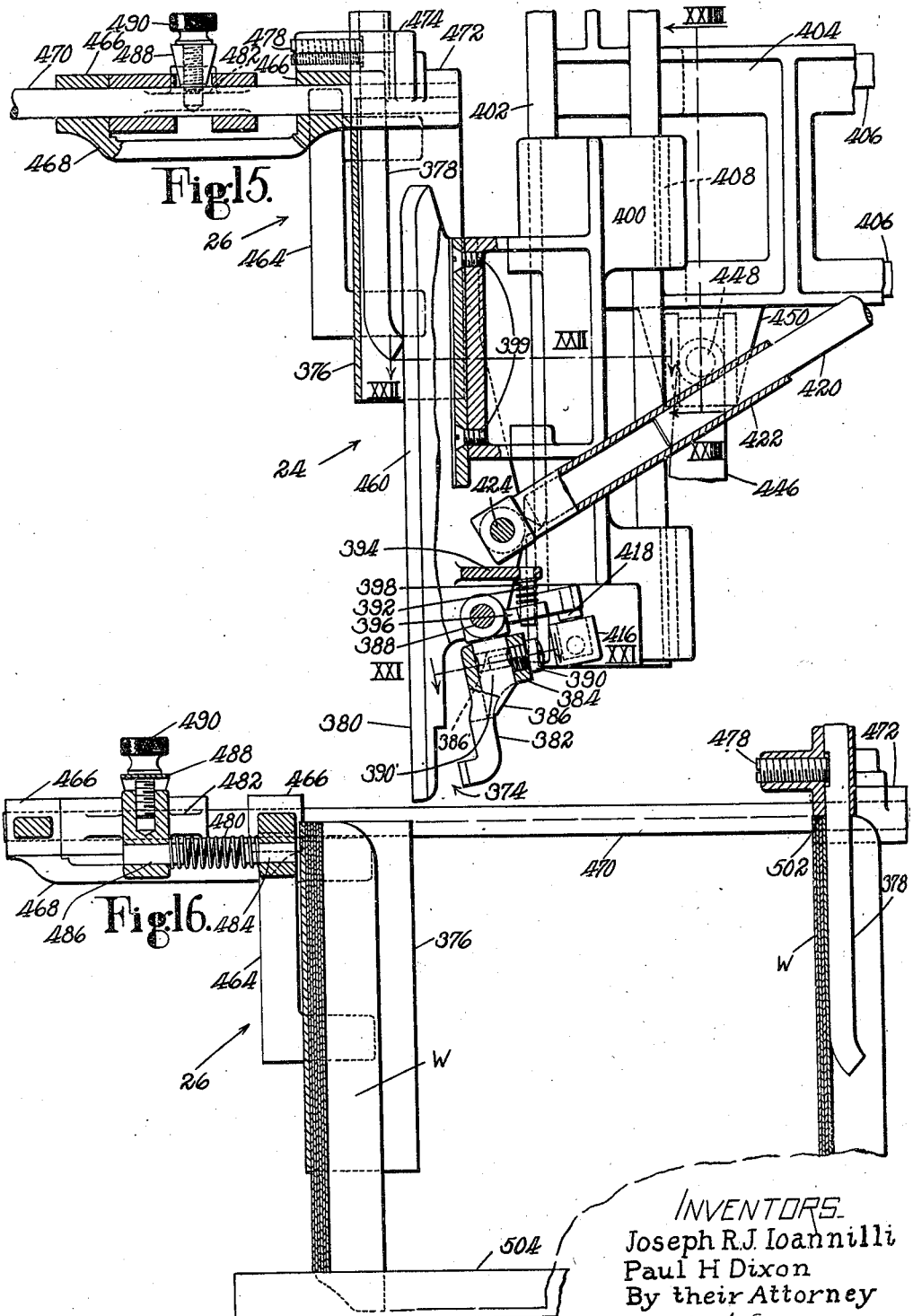

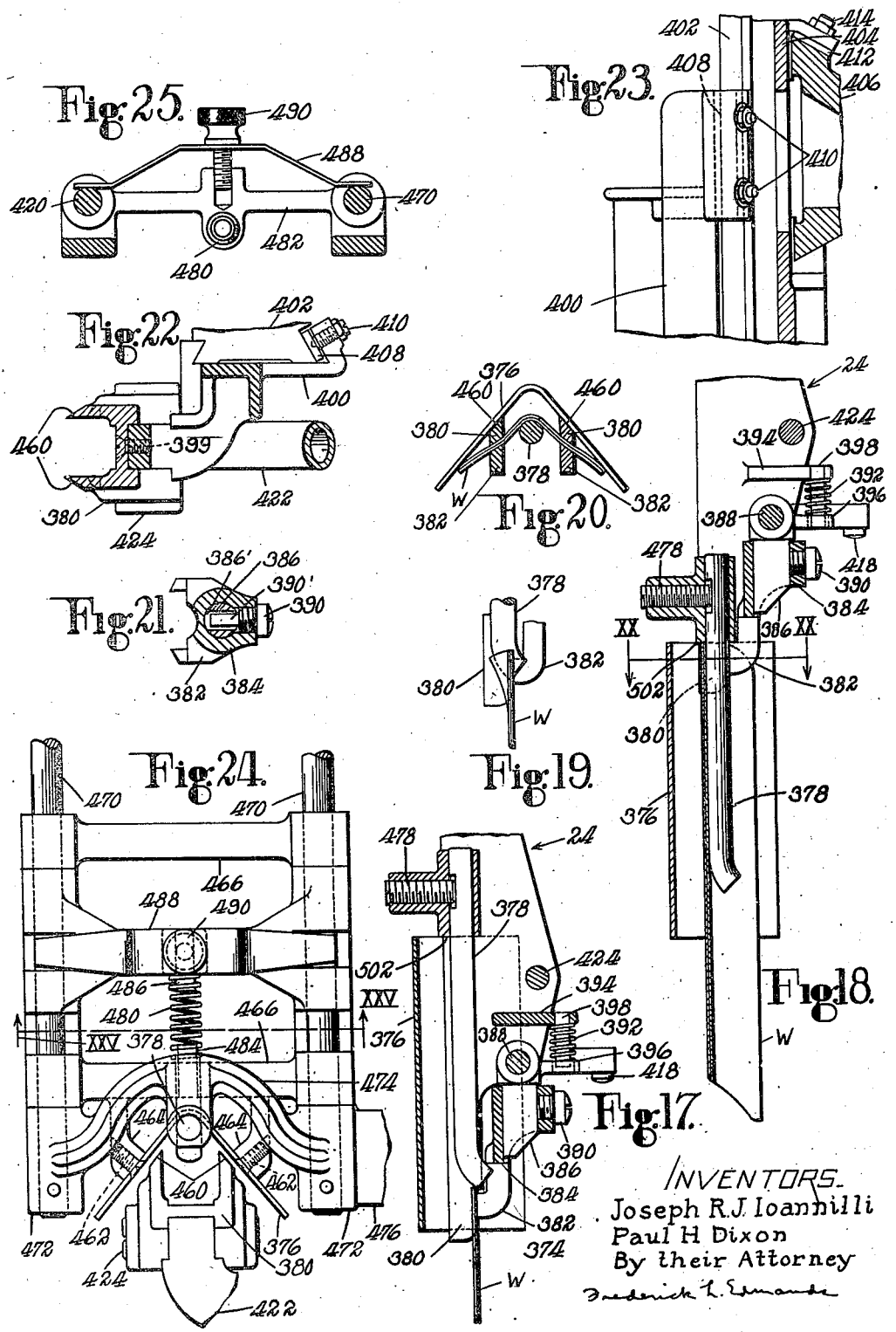

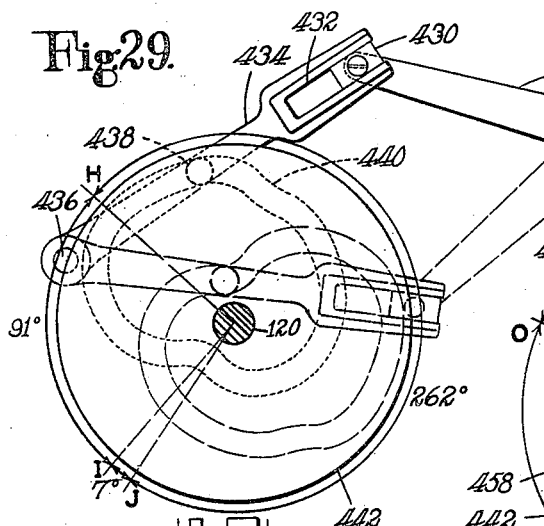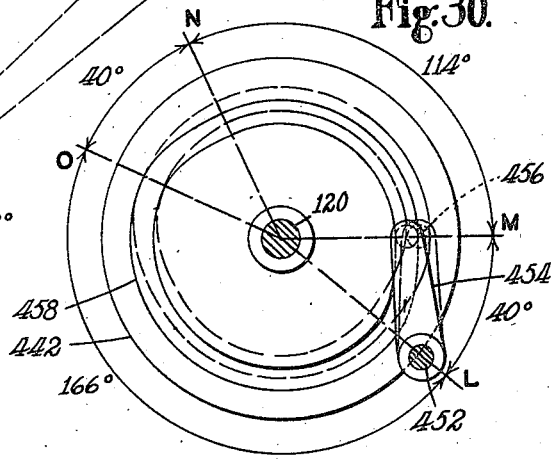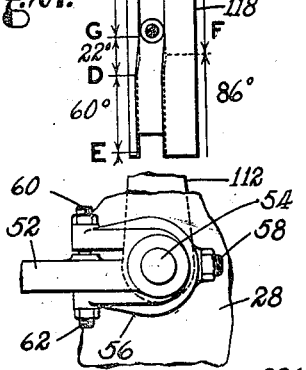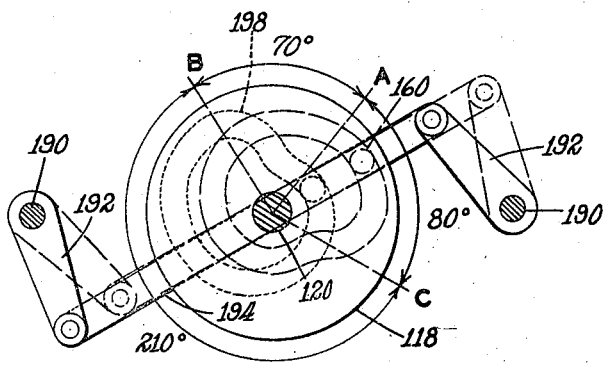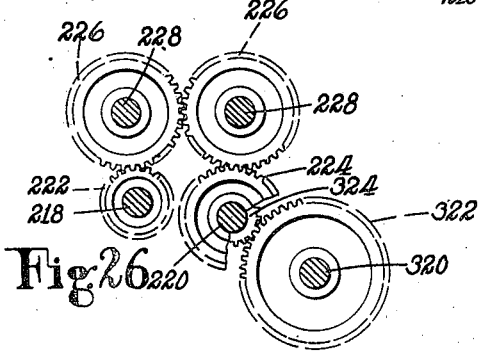

Patented Mar. 9, 1943

2,313,148

UNITED STATES PATENT OFFICE 2,313,148

ASSEMBLING MACHINE

Joseph R. Ioannilli, Hamilton, and Paul H. Dixon, Wenham, Mass., assignors to United Shoe Machinery Corporation, Flemington, N. J., a corporation of New Jersey Application April 11, 1941, Serial No. 388,026

46 Claims. (Cl. 12—52)

This invention relates to a machine for operating on shoe parts and as illustrated herein is more particularly related to a machine for adhesively uniting tongues and linings.

A machine for assembling tongues and linings is shown and described in United States Letters Patent No. 2,272,207, granted February 10, 1942, on an application filed in the name of Adrien L. Jalbert. In that machine the tongue and lining are placed on reciprocating tables which move the pieces toward two pairs of feed rolls, one of the rolls being supplied with cement, thereby to apply cement to one side of the tongue, and two of the rolls co-operating to press the tongue and lining into engagement. It is an object of this invention to provide an improved machine of that type having increased speed and accuracy of operation and at the same time requiring less skill to operate the machine.

In the improved machine, stationary work tables are provided to hold the component parts of the work prior to their presentation to the adhesive applying and uniting rolls, and reciprocating work clamps are employed for moving the component parts of the work along the tables toward the applying and uniting rolls. In order to position the parts of the work on the tables so that they will be in proper registration when pressed face to face by the uniting rolls, gages against which the operator places the work pieces are associated with the tables, and one feature of the invention resides in an arrangement of this sort having novel means for withdrawing the gages from the tables to permit movement of the work along the tables toward the uniting rolls without interference prior to the movement of the work clamps.

The uniting rolls for pressing the tongue and lining together are independently driven and, in order to permit the passage of irregularities in the work, they are mounted for movement relative to each other. In order to provide for this relative movement, and yet to retain direct drive, Oldham coupings are employed. As a result, when one roll is moved laterally because of a high spot in the leather, it slides sidewise in the Oldham coupling, thereby varying the speed of the roll slightly. As a consequence, one roll will move faster or slower than the other and the pieces of work may be displaced with respect to each other or wrinkles may be formed in the work. To prevent this, there is provided, in accordance with another feature of the invention, means whereby movement of one of the rolls bodily because of a high spot or a bump in the work will produce an equal movement of the other roll bodily so that both rolls occupy corresponding positions with respect to their Oldham couplings, thereby causing the uniting rolls to always rotate at the same peripheral speed relative to each other.

It is desirable to collect the assembled tongues in a work holder and to mold them during the time when the cement is setting and drying. With this in mind, another feature of the invention resides in work transferring or stacking mechanism arranged to transfer the assembled pieces from the uniting rolls to the work holder. To accomplish the molding, the work holder comprises a forming plate and means for retaining the work in engagement with the forming plate so that when the assembled tongues are disposed in the work holder between the forming plate and the retainer they will be bent transversely to a contour corresponding substantially in shape to the instep of the foot.

The invention will now be described in detail with reference to the accompanying drawings, in which Fig. 1 is a front elevation of the entire machine;

Fig. 2 is a side elevation, partly in section, looking from the right end of Fig. 1;

Fig. 3 shows the overlapping relation of a tongue and lining;

Fig. 4 is an enlarged section taken on the line IV—IV of Fig. 5, showing the adhesive applying and uniting rolls;

Fig. 5 is an elevational view of the uniting rolls as seen from the right end of Fig. 4;

Fig. 6 is a section taken on the line VI—VI of Fig. 4;

Fig. 7 is an elevation of the adhesive tray adjustment means as seen from the left end of Fig. 4;

Fig. 8 is a plan view of the work supporting tables and gages;

Fig. 9 is a section taken through the work supporting table at the left side of the machine as seen in Fig. 8, showing means for adjusting the end gages;

Fig. 10 is an end elevation of the work gages as viewed from the right end of Fig. 9;

Fig. 11 is a fragmentary plan view, showing the work supporting table and work clamps at the right-hand side of the machine as shown in Fig. 1;

Fig. 12 is a side elevation, partly in section, of the work supporting table and work clamps;

Fig. 13 is a section taken on the line XIII—XIII of Fig. 11;

Fig. 14 is a section taken on the line XIV—XIV of Fig. 11;

Fig. 15 is a side elevation, partly in section, of the work transferring or stacking mechanism;

Fig. 16 is a side elevation of the work holder and former shown in its expanded position;

Fig. 17 shows the transferring means in its closed position;

Fig. 18 shows the transferring means substantially at the top of its stroke;

Fig. 19 shows the transferring means drawing the upper edge of the work between the forming plate and the retainer bar;

Fig. 20 is a section taken on the line XX—XX of Fig. 18;

Fig. 21 is a section taken on the line XXI—XXI of Fig. 15;

Fig. 22 shows a section taken on the line XXII—XXII of Fig. 15;

Fig. 23 is a section taken on the line XXIII—XXIII of Fig. 15;

Fig. 24 is a plan view of the work holder and former;

Fig. 25 is a section taken on the line XXV—XXV of Fig. 24;

Fig. 26 is a section taken on the line XXVI—XXVI of Fig. 2;

Fig. 27 is a fragmentary view of the lever and cam for operating the work gages;

Fig. 28 shows the cam and lever means employed for operating the work clamps;

Fig. 29 shows the cam and lever mechanism for providing the vertical motion of the work transferring or stacking mechanism;

Fig. 30 shows the cam and lever for providing the horizontal motion of the work transferring or stacking mechanism.

Figure 31:
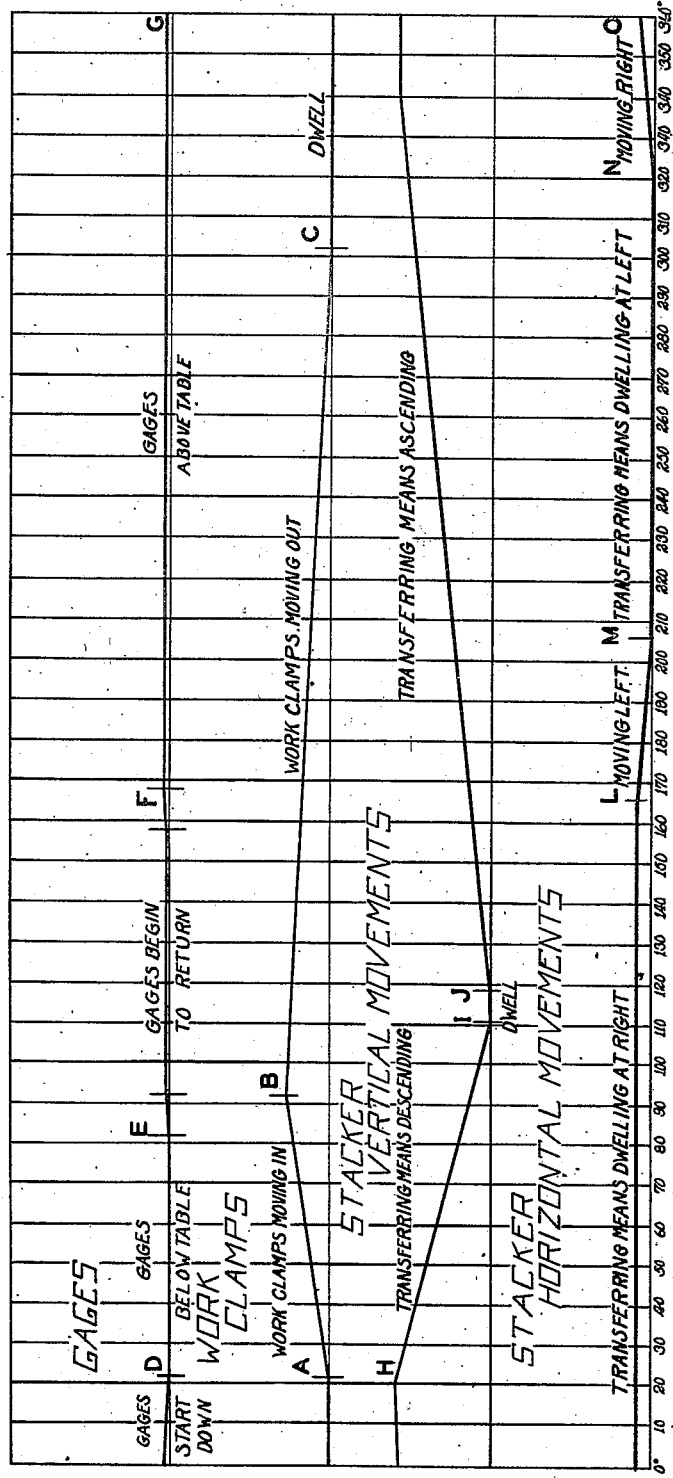
Fig. 31 is a chart of the cam motion showing the sequence of operation of the various parts of the machine.

The machine as illustrated herein comprises generally a pair of work tables 10 and 12 (Fig. 1) upon which the two component parts of the lined tongue may be placed at opposite sides of the machine, a pair of work feeding means 14 and 16 arranged to move the parts inwardly along the tables to a pair of work uniting rolls 18 and 20, means for applying an adhesive to the lower surface of one of the parts of the work, indicated generally by the reference character 22 (Fig. 4), and work transferring or stacking mechanism 24 (Fig. 15) for removing the assembled tongue and lining from the uniting rolls and depositing it in a work holder and former 26 (Fig. 16) in stack form so that a number of lined tongues may be accumulated and removed from the machine at one time. The elements of the machine referred to above are assembled in co-operating relation upon a frame 28 which, in turn, is supported on a base 30 (Fig. 1).

The work supporting tables 10 and 12 provide horizontal surfaces upon which the operator may place the parts of the work. Vertical skirt portions 32 depend from the front edge of the tables. The lower edge of the skirt at the left side of the machine meets the top edge of a wall 34 extending vertically from the base 30 along the front of the machine. At the right side of the machine (Fig. 1) the wall 34 is cut away along the line 36 and a panel 38 is set therein with its upper edge meeting the lower edge of the skirt depending from the table 10, for a purpose which will appear hereinafter. The tables 10 and 12 are supported at opposite ends by means of pedestals 40 screwed to the base 30 at 42. The tables are fastened to the pedestals by means of screws 44 (Fig. 7).

It is customary to form the lining L somewhat smaller than the tongue T so that the tongue overlaps the lining at one end and along its sides, as illustrated in Fig. 3. In order to unite the tongue and lining in just this relation, gages 46 and 48 (Figs. 8 and 11) are provided which project through slots 50 in the tables 10 and 12 for so positioning the tongue and lining that when they are pressed into engagement they will be united in the proper relation with respect to each other. Since the work is moved along the surface of the tables, the gages 46 and 48 must be withdrawn from the surfaces of the tables during the forward feeding movement of the work and, consequently, the gages are mounted on reciprocable arms 52 (Fig. 2) which are positioned below the tables on opposite sides of the machine and which are operable to withdraw the gages immediately prior to the actuation of the feeding means so that they will not impede the progress of the work. The arms 52 are adjustably mounted at their rear ends on the opposite ends of a shaft 54 journaled in the frame 28 (Fig. 2) and are fixed to turn with the shaft by means of clamps 56 fixed thereto by screws 58. Pairs of screws 60 and 62 are carried by the clamps 56 and abut opposite sides of the arms 52, thereby providing means for adjusting the position of the arms with respect to the shaft 54 and consequently affording means for adjusting the height to which the gages 46 and 48 will project above the surfaces of the tables.

The gages 46 and 48 are provided along the front sides and inner ends of the tables (Fig. 8) and are adjustably mounted on the arms 52 in order to accommodate work pieces of different sizes and also to permit positioning one part with respect to the other. To this end, the free ends of the arms 52 are recessed, providing smooth surfaces 64, as shown in Figs. 9 and 14, leaving shoulders 66. The side gages 46 are provided with H-shaped bases 68 (Fig. 11) which rest upon the surfaces 64 and are held in spaced relation by means of spacers 70 and 72, the former being U-shaped. Cover plates 74 having slots 76 for the passage of the ends of the gage pins are placed over the H-shaped bases of the gages and are fastened to the surfaces 64 by means of screws 76'. Notches 78 are formed at the edges of the cover plate into which project the ends of the U-shaped spacers 70, a few thousandths clearance being provided to permit adjustment, as will appear hereinafter. The spacers 72 are held in place by means of a pair of pins 80 which project through holes 82 formed in the cover plates 74, the holes being a few thousandths oversize to permit adjustment, as will appear hereinafter. The cover plates 74 are held by means of washers 84 placed between the surfaces 64 and the cover plates 74 slightly above the top surfaces of the H-shaped bases 68 so that there is sufficient clearance to permit the gages to be moved widthwise of the surfaces 64. Thus, it is apparent that the bases of the gage pins may be slid between the surfaces 64 and the cover plates 74. In order to lock the side gage pins in place after they have been set in the proper position, means is provided for forcing the spacer plates 70 and 72 against the H-shaped bases 68 of the gage pins. This is accomplished by means of end plates 86 (Fig. 11) disposed between the cover plates 74 and the surfaces 64 with their inner edges adjacent to the bases of the first of the gage pins. Reduced extensions 88 are formed on the outer ends of the end plates 86, the extensions having downwardly projecting flanges 90 through which bolts 92 are passed. The inner ends of the bolts 92 are threaded into the arms 52 and are locked in position by means of nuts 94. Knurled thumb nuts 96 are placed on the outer ends of the screws and by rotating the screws in a right-handed direction the end plates 86 may be forced inwardly, as seen in Fig. 11, thereby taking up the slack between the spacer plates 70 and 72 and the bases of the gage pins so as to lock them securely in place. The gages 48 and 48' at the inner ends of the tables, as heretofore indicated, locate the component parts of the work so that when they are united the tongue will overlap the lining a proper amount at its end. The gages 48 for the leather or exposed part of the tongue, which is disposed on the right-hand table, as shown in Fig. 1, are fixed. The gages 48' on the left-hand table for the lining, however, are adjustable so that the longitudinal position of the lining may be adjusted to give the proper margin of overlap. The means for adjusting these gages 48' is shown in Fig. 9. The gages 48', which are two in number, are fastened to a block 98 slidably mounted on a bifurcated extension 100 formed integral with the inner edge of the left-hand arm 52 and extend upwardly through a pair of slots 102 formed in the table 12. A screw 104 is journaled in bosses 106 formed on the under side of the arm 52, the inner end of the screw being threaded through the block 98 so that rotation of the screw moves the gage pins 48' longitudinally. To prevent longitudinal movement of the screw itself and to prevent damage to the gage pins 48' by jamming the pins against the inner ends of the slots 102, the screw 104 is yieldably held by means of a coil spring 108 disposed upon it between the boss 106 and a collar 110 fixed to the screw.

The gaging mechanism, except for the adjustable gages 48' just described, is identical on opposite sides of the machine and is moved into and out of work gaging position by the arms 52, the latter being oscillated by means of an arm 112 (Figs. 2 and 27) fastened to the shaft 54 to which the arms 52 are fixed. The arm 112 carries a cam follower 114 at its upper end which rides in a cam groove 116 formed in the peripheral surface of a cam 118 which, in turn, is fixed to a cam shaft 120.

The work feeding means 14 and 16 which move the work along the surfaces of the tables 10 and 12 comprise work clamps 122 (Fig. 12). Since the work clamps are identical on opposite sides of the machine, only that at the right side of the machine has been illustrated in detail. Each work clamp consists of an unyielding jaw 124 and a movable jaw 126. The unyielding jaw 124 (Figs. 12 and 13) is mounted on the under side of the table 10 with its upper end extending through a slot 128 formed longitudinally of the table. In order to permit movement of the lower jaw 124 longitudinally of the table, the jaw is slidably mounted on a shaft 130 (Fig. 11) supported in a pair of shaft hangers 132 and 134, the hangers being attached to the under side of the table by means of screws 136. The shaft 130 is prevented from turning in its hangers by means of a setscrew 138 threaded through the hanger 134. The hanger 134 is provided with a lateral extension 140 having formed at its front edge a groove 142 which slidably receives a tongue 144 (Fig. 13) formed on the inside edge of the fixed jaw 124, thereby rigidly to hold the jaw 124 with its upper end on a level with the surface of the table 10. Spaced ears 146, on the rear of the fixed jaw 124, provide an upright groove for a purpose which will subsequently appear. The movable upper jaw 126 is attached to a bracket 148 by means of screws 150, the bracket being tiltably mounted on a stub shaft 152 which is fixed to a carriage 154 by means of a screw 156. A bolt 158 is passed through a boss 160 formed on the bracket 148 and a boss 162 formed on the carriage 154, serving to hold the bracket 148 against a spring 164 disposed between the bosses 160 and 162. This permits the upper jaw 126 to yield when it is brought down into engagement with the lower jaw 124, should there be any unusually thick object between the two, without damage to the jaws. To permit longitudinal movement of the upper jaw, the carriage 154 is slidably mounted on a shaft 166 (Fig. 11) which, in turn, is supported on the arm 52 by means of bosses 168 and 170. A pin 172 is passed through the shaft 166 in the bearing 172 rigidly to hold the shaft in place. The carriage 154 is provided at one end with a lateral extension 174 which is provided with a passage 176 for the reception of a spindle 178 fixed at its ends to the arm 52 upon pedestals 180 and 182. This permits movement of the carriage 154 longitudinally of the shaft 166 and at the same time prevents it from tipping about the shaft 166, as a center, thereby holding the upper jaw 126 in a horizontal plane. A cup 184 is formed on the back of the carriage 154 for the accommodation of the head of a crank pin 186 fixed therein (Fig. 11). A crank 188 is fastened to the crank pin 186 and provides means for reciprocating the carriage 154 so as to move the upper jaw 126 longitudinally of the table. The crank 188 is fastened for reciprocation to one end of a shaft 190 (Figs. 1 and 28) journaled in the frame 28 of the machine, the opposite end of the shaft 190 having fixed thereto a link 192, the latter being connected to a cam bar 194. The cam bar 194 is provided with a cam follower 196 (Fig. 28) which rides in a cam groove 198 formed on one face of the cam 118. The opposite end of the cam bar is likewise connected by means of a link 192, a shaft 190 and a crank 188 to the left-hand work clamp, as shown in Fig. 1. It is apparent from the foregoing construction that as the gages 46 and 48, 48' are moved downwardly to a level below the surface of the table the upper jaw 126 which is mounted on the arm 52 is brought down to co-operate with the lower jaw 124 in gripping the work. As the upper jaw is lowered into gripping position, an upright rib 202 (Fig. 13) formed thereon passes into the groove between the ears 146. Consequently, when the upper jaw is moved longitudinally of the table, it will carry the lower jaw along with it by means of the aforesaid connection.

As the work is moved toward the uniting rolls 18 and 20, the leading ends thereof are caught between the lower surfaces of the rolls 18 and 20 and co-operating rolls 204 and 206 (Fig. 4) which grip the leading ends and feed them inwardly against a triangular guide 208 having concave surfaces 210 which conform to the upgoing sides of the rolls 18 and 20, respectively, thereby directing the work pieces upwardly in contact with the surfaces of the rolls 18 and 20 and into contact with each other. The guide 208 (Fig. 1)

is supported at its ends by plates 212 fastened thereto by screws 214, the plates resting in U-shaped bearings 216 screwed to the frame 28. The base of the triangular guide 208 (Fig. 4) lies between the rolls 204 and 206 and the apex extends upwardly between the rolls 18 and 20 to a point somewhat short of a horizontal line passing through the centers of the rolls. The concave surfaces of this triangular guide are grooved to reduce the surface of contact between the work and the guide as the work is moved along so that the adhesive applied to the surface of the work, as will appear hereinafter, will not adhere thereto. The rolls 204 and 206 are mounted on parallel shafts 218 and 220 below the rolls 18 and 20. The shafts 218 and 220 extend through the frame of the machine and have fixed thereto gears 222 and 224 (Fig. 26) which mesh with a pair of meshing gears 226 fastened to a pair of parallel shafts 228.

The work is not always uniform in thickness and therefore it is necessary to provide some play between the roll 18 and the surfaces of the roll 204 and guide 208 and, correspondingly, between the roll 20 and the roll 206 and guide 208. It is also necessary to provide some play between the co-operating surfaces of the rolls 18 and 20. In order to drive the rolls and at the same time preserve the flexibility referred to, the rolls are mounted on shafts 230 (Fig. 4) which are connected by means of Oldham couplings 232 (Fig. 2) to the pair of parallel shafts 228 (Fig. 26). One of the shafts 228 has fixed thereto a worm gear 234 which is rotated by a worm 236 fastened to a driven shaft 238 (Fig. 2). The other of the shafts 228 is driven from the first-named shaft by means of the aforesaid meshing gears 226 fixed to the shafts 228.

While the Oldham couplings permit the rolls 18 and 20 to move relative to each other as desired, the surface speed of the rolls will change relative to each other, due to the fact that the shafts will frequently occupy different positions in their respective Oldham coupling connection. A difference in the surface speeds of the two rolls tends to move the tongue and lining with respect to each other and thereby dislocate their original positioning so that the tongue and lining would wrinkle or would not have their proper overlapping relation. To permit movement of the rolls and at the same time eliminate any change in speed between the surfaces of the rolls, the rolls are mounted as follows. A bracket 240 (Figs. 2 and 4) is fastened to the frame of the machine and is provided with a horizontal arm 242 which extends laterally from the face of the frame. The arm 242 has formed integral therewith a pair of parallel spaced plates 244 which extend at right angles to the arm and are provided at opposite ends with pairs of bearings 246 and 248 adapted to receive spindles 250 and 252. The spindles 250 and 252 tiltably support pairs of arms 254 (Fig. 4), each pair being joined by means of a crossbar 256. The upper end of one of the arms 254, at the left as seen in Fig. 4, is extended at 258, the extension being joined by means of links 260 and 262 to the spindle 252. The link 260 is attached at one end to the extension by means of a pin 264 and at the other end to one end of the link 262 by a pin 266. The link 262 is rigidly connected at its opposite end to the shaft 252, so that lateral movement, for example, of the roll 20 to the left (Fig. 4) will turn the arm 254 in a clockwise direction. This, in turn, thrusts the link 260 downwardly in the direction of its length to turn the link 262 in a counterclockwise direction. Counterclockwise movement of the shaft 252 tips the arm 254 which supports the roll 18 outward in a lateral direction opposite to the movement of the roll 20. It is apparent, therefore, that movement of either roll 18 or 20 in a lateral direction will cause the other roll to move an equal amount in the opposite direction. A threaded boss 268 is formed on the end of one of the right-hand arms 254 and is yieldably joined to the extension 258 by means of a bolt 270 which is passed through a boss 272 formed at the end of the extension 258. A coil spring 274 is placed on the bolt 270 and yieldably holds the linkage in an expanded position so that the rolls 18 and 20 are normally yieldably urged toward each other to press the component parts of the work together. A pair of nuts 276 are provided at the end of the bolt 270 for adjusting the proximity of the rolls with respect to each other. The lower ends of the arms 254 are provided with bosses 278 in which there are fixed trunnions 280, the latter tiltably supporting pairs of angular arms 282 having at their lower ends bearings 284 and bearing caps 286 which rotatably receive the shafts 230 to which the rolls 18 and 20 are fixed. Each pair of angular arms 282 is joined by a web 290, the webs being yieldably fastened to the crossbars 256 (Fig. 4) by means of screws 292 and springs 294 disposed between the heads of the screws and the bottoms of recesses formed in the webs 290. The springs 294 serve yieldably to urge the rolls 18 and 20 toward their co-operating rolls 204 and 206, respectively. Adjusting screws 296 are also provided in the webs 290 which abut the surfaces of the crossbars 256 and provide means for varying the proximity of the rolls 18 and 20 to their co-operating rolls 204 and 206.

In order to unite the tongue and lining, an adhesive is applied to the under or flesh surface of the tongue and this is accomplished by means of the roll 204 which constitutes an adhesive applying roll. The adhesive applying roll 204 is supplied with adhesive by means of a pick-up roll 298 (Fig. 4) which is provided with hubs 300 and trunnions 302 and 304 journaled in bearings 306 carried by plates 308 attached to the opposite walls 310 of a cement tray 312 by means of screws 314. The plates 308 have U-shaped notches in their upper edges which receive similarly shaped bearing blocks 316 in which the bearings 306 are fixed. In order that the pick-up roll 298 may be removed for cleaning purposes and so that it may be shifted to and from the applying roll 204 to regulate the thickness of the adhesive on the roll 204, its trunnion 304, which is extended (Fig. 6), is detachably connected by a pin coupling 318 (Fig. 2) to a shaft 320. The shaft 320 (Fig. 26) has fixed thereto a gear 322 which meshes with a gear 324 fixed to the shaft 220, the latter being driven from the shaft 228 by way of the gears 226 and 224.

The cement tray 312 is removably supported on the base of the machine so that it may be cleaned. A pair of guides 328, shown in Fig. 2, engage the opposite sides of the tray and hold it in proper alinement. The tray is yieldably locked in working position with the pick-up roll 298 substantially in contact with the applying roll 204 by means of a hook 330 which holds one end of the tray against an abutment 332. The hook engages the lower edge of a plate 334 fastened to the tray by means of screws 336 (Fig. 4). The hook is mounted on an arm 338 fixed to a spindle 340, the hook being held in a retracted position by means of a spring 342 fastened at one end to the arm 338 and at its opposite end to the frame of the machine at 344. A block 346 supports the head of the hook 330 in its locked position. When it is desirable to remove the tray, the hook is moved longitudinally against the action of the spring 342 until the head clears the edge of the block 346, whereupon it drops below the edge of the plate 334. The tray 312 is then moved longitudinally beyond the head of the hook and is then withdrawn laterally from the machine. In order to regulate the thickness of the adhesive on the applying roll 204, means is provided for shifting the tray 312 while it is in its locked position. To this end, the abutment 332 is mounted between a pair of upright arms 348 (Fig. 7) upon a pin 350 journaled in the upper ends of these arms, the arms, in turn, being fastened to a shaft 352 by means of a pin 354. The abutment 332 is sickle-shaped (Fig. 4) so that its rear end extends rearwardly of the pin 350 and downwardly to a point opposite the lower end of the upright arms 348. A screw 356 is passed through the lower end of the abutment 332 and is threaded into the lower end of the arms 348, a spring 358 being disposed between the abutment and the lower end of the arm. By turning the screw 356, the abutment may be retracted or extended to move the roll 298 to or from the roll 204. A lever 360 is fastened to the outer end of the spindle 340 on the outside of the panel 38 of the machine and provides means for rotating the spindle 340 and thereby moving the hook 330 out of engagement with the edge of the plate 334. A pointer 362 is fixed to the outer end of the shaft 352 and co-operates with a graduated scale on a plate 364 fixed to the panel 38 to indicate the position of the roll 298 with respect to the roll 204. The rear end of the adhesive tray 312 is reduced in cross section at 366 (Figs. 2 and 4) and terminates in a cup 368 adapted to receive the neck of an adhesive bottle arranged as a supply of the chicken-feed type. A web 370 is formed integral with the reduced portion of the receptacle 312 and at right angles thereto, the outer end of the web providing a support to which the panel 38 is fastened by means of screws 372. Consequently, the tray may be removed without removing the whole of the table 10.

Unless a suitable mechanism is provided, the work delivered by the rolls 18 and 20 will be piled indiscriminately, making it necessary for the operator to rehandle it in order to stack it and deliver it for its further use. In the present machine, in order to eliminate unnecessary handling, there is provided a work transferring or stacking mechanism and work holder, indicated generally by the reference characters 24 and 26 (Figs. 15 and 16), which is arranged also to shape the work, that is, to mold it to a concavity substantially complemental to the shape of the instep. The work transferring device 374 is adapted to grasp the leading edge of an assembled tongue and lining as it leaves the uniting rolls and carry it upward to deposit it in a variable capacity work holder consisting of a work forming plate 376 and a retainer bar 378. The work transferring device 374 consists of an unyielding forked jaw 380 and a movable forked jaw 382 which co-operates with the unyielding jaw to grip the leading edge of the work, as will appear hereinafter and as shown in Fig. 20. The movable jaw 382 has formed integral therewith a sleeve 384 which is slipped over the end of a stud 386 pivotally attached to the unyieldable jaw by means of a pin 388 (Fig. 17), the former being loosely fastened to the stud by means of a screw 390 having a pin 390' on its inner end which fits loosely into a diametrical hole formed in the stud. This permits self-adjustment of the jaw 382 in accordance with any variation in the thickness of the work. The movable jaw 382 is yieldably held in engagement with the unyielding jaw by means of a spring 392 disposed between a web 394 formed on the unyielding jaw and a perforated flange 396 on the hub of the stud 386. The spring 392 is held in place by a pin 398 passing therethrough, one end of the pin being fastened to the web 394 and the other end extending through the perforated flange 396.

The transferring means, which consists of the jaws 380 and 382 for reciprocation between the uniting rolls and the work holder, is fastened to a carriage 400 by means of screws 399, the carriage being slidably mounted on a vertically extending track 402 (Fig. 15). The track 402 is formed integral with a carriage 404 which, in turn, is slidably mounted on a horizontally disposed track 406 (Figs. 2 and 23), for a purpose which will appear hereinafter. The carriage 400 is provided with a dovetail way (Fig. 22) which co-operates with a dovetail formed on the track 402 and is slidably connected thereto by means of a gib 408 disposed between one side of the way and the dovetail and held in place by means of setscrews 410. The carriage 404 is connected to the track 406 (Fig. 23) in a similar manner by means of a gib 412 and setscrews 414.

When the carriage 400 is in its lowermost position (Fig. 15), which is the position in which the jaws 380 and 382 are ready to grasp the leading edge of the work, the movable jaw 382 is held open against the action of the spring 392 by means of an abutment block 416 fixed to the lower end of the track 402 (Fig. 15), the block lying in the path of a head 418 formed at the end of the flange 396 and consequently tilting the jaw 382 about its pivot 388 as the carriage 400 moves to its lowermost position.

The carriage 400, and consequently the transferring means 374, is reciprocated vertically, to lift successive pieces of work to the work holder, by means of an arm 420 (Fig. 15) which is slidably connected to a sleeve 422 pivotally attached at 424 to the carriage. The arm 420 at its opposite end is clamped to a shaft 426 (Fig. 1) journaled in the frame of the machine, the shaft being oscillated by a lever 428 the free end of which has a block 430 slidable in a slot 432 formed in the end of a cam lever 434 pivoted on the frame of the machine at 436. The lever 434 has fixed thereto a cam follower 438 (Fig. 29) which co-operates with a cam groove 440 formed in one face of a cam 442 rotation of which oscillates the lever 434 and hence the carriage 400. In order to separate the forming plate 376 and retainer bar 378 to admit the work, the carriage 400 is reciprocated horizontally, during its vertical movement, on the track 406 so that the transferring means will push the forming plate 376 back from the bar 378, as will appear hereinafter, by means of a lever 446 (Figs. 1 and 15) pivotally attached at 448 to a flange 450 formed integral with the carriage 404. The lever 446 (Fig. 1) is fixed to a shaft 452 journaled in the frame of the machine, the shaft being oscillated by means of a lever 454 fixed thereto, the other end of the lever 454 carrying a cam follower 456 (Fig. 30) which co-operates with a cam track 458 formed in the opposite face of the cam 442.

The vertically reciprocating carriage 400 and transferring means 374 move the work from the uniting rolls upwardly toward the bottom of the forming plate 376. The upper portion of the transferring means 374 is U-shaped in cross section, as shown in Fig. 22, and as the carriage 400 moves upwardly the beveled ends 460 of the U-shaped portion are parallel to the inner faces of the forming plate 376. At approximately one-fifth of the ascending stroke, that is, substantially at the point where the leading edge of the tongue reaches the lower edge of the forming plate (Fig. 19), the carriage 404 begins to move to the left, causing the U-shaped portion 460 to straddle the retainer bar, as seen in Fig. 20, and forcing the forming plate 376 to move away from the retainer bar 378 to admit the work as it is drawn up between the plate and the bar. The combined vertical and horizontal movements of the transferring means cause the transferring means to move obliquely up from the uniting rolls toward the work holder.

The forming plate 376 is concave or V-shaped and is fastened by means of screws 462 to C-shaped supports 464 depending from a bar 466 (Figs. 15 and 24). The bar 466 forms part of a frame 468 (Fig. 15) which is slidably mounted on a pair of parallel horizontally disposed rods 470. The rods 470 are fixed at their ends in a pair of bosses 472 (Fig. 24) which are rigidly joined by a yoke-shaped member 474, the bracket formed thereby being fastened to the frame of the machine by means of a neck 476. The retainer bar 378 is disposed opposite to the forming plate and is fixed in a vertical position to a nub extending from the yoke-shaped member 474 by means of a screw 478. The forming plate 376 is yieldably held in co-operating relation with the retainer bar 378 by means of a spring 480 disposed between the bar 466 and a crossbar 482 (Fig. 25), the spring being retained in place by studs 484 and 486. The crossbar 482 is also slidably mounted on the parallel rods 470 between the bars 466 of the frame 468. During the disposition of the first few pieces of work between the forming plate and the retainer bar, the spring 480 yields so that the pieces are held under pressure, thereby causing them to conform to the curvature of the forming plate. However, as the number of pieces increases, the capacity of the holder must be increased correspondingly. Consequently, the frame 468 must move backwardly along the parallel rods 470. This movement is procured automatically as the pressure between the forming plate 376 and the retainer bar 378 increases or reaches a predetermined pressure by means of a friction plate which holds the crossbar 482 from freely sliding on the rods 370. This friction plate consists of a spring steel leaf 488 the ends of which bear against the parallel rods 470, the leaf being secured to the crossbar 482 by means of a thumbscrew 490 (Fig. 25). As the pieces pile up between the forming plate 376 and the retainer bar 378, the frame 468 moves backwardly against pressure of the spring 480 until it comes in contact with the crossbar 482, or until the pressure necessary to compress the spring 480 overcomes the frictional resistance of the leaf spring 488, whereupon the crossbar 482 will be forced back step by step. The amount of molding may be adjusted by increasing or decreasing the action of the spring 488 so that the frame 468 will move back only under a great deal of pressure or under a very light pressure. The ends of the rods 370 are joined by a cross member (not shown) which reinforces the whole unit and provides a stop for the movement of the frame 468. When the number of pieces of work stacked between the forming plate 376 and the retainer bar 378 has forced the frame 468 to its limiting point, a string may be tied about the lower ends of the work and the whole stack removed from the machine.

Near the top of the vertical movement of the transferring means the leading edge of the work abuts a surface 502 (Figs. 16 and 18) on the bottom side of the yoke-shaped member 474 which, together with the friction between the retainer bar 378 and the forming plate 376, creates sufficient drag on the work to cause further vertical movement of the transferring means 374 to disengage the jaws from the work. After disengagement from the work, the transferring means begins to move to the right, completing its movement to the right at the upper extremity of its vertical movement, whereupon it descends to its original position for a subsequent piece of work. To insure an even disposition of the work pieces, a bar 504 is fastened to the frame of the machine by means of screws 506 and 508 below the rods 470 and parallel thereto, engage the notched lower ends of the work pieces and to support the same, as illustrated in Figs. 1 and 16.

The drive shaft 238 is provided at its outer end with freely turning and fixed pulleys 510 and 512, respectively, a belt shifter 514 being provided for shifting the belt from one to the other of the pulleys, thereby to connect or disconnect the shaft to an outside source of power.

By reference to the cams shown in Figs. 27, 28, 29, 30 and the cam chart Fig. 31, the sequence of operations of the machine may be followed. The letters appearing on the cam chart (Fig. 31) correspond to similarly marked sections of the cams whose motion is plotted on the cam chart. Referring to the motion of the work clamps and starting for convenience at 0° of rotation of the cam 118 at the left-hand end of Fig. 31, the work clamps are shown to be dwelling at the outer end of their stroke as represented in Fig. 1. During this period of dwell the operator is given an opportunity to place the work on the tables. When the cam 118 has turned approximately 22° from 0°, the work clamps start to move inwardly, this point being marked A in Figs. 28 and 31. Inward movement of the work clamps continues until the cam has turned approximately 70°, marked B, this part of the movement serving to present the leading edges of the work to the uniting rolls. For the next 210° of rotation, that is, to the point C, the work clamps are returning to their outer position; and from C to A, an angular rotation of 80°, the work clamps dwell, thus completing the cycle. During this movement the gages for positioning the work (Figs. 27 and 31) move up into and down out of position. Starting at 0° again, the gages 46, 48 and 48' are shown as being withdrawn below the tables by rotation of the cam 118 so that at D, which corresponds to the initial inward movement of the work clamps, the gages are below the tables, thereby permitting the work clamps to move the work pieces along the tables without interference, the cam 118 turning through approximately 60° during this time, represented from D to E. Just prior to the completion of the inward movement of the work clamps, the cam 118 begins to return the gages toward gaging position, indicated at E, and continues to move them toward the gaging position which is complete at the point F in approximately 86° of rotation of the cam. For the next 192° of rotation, F to G, the gages remain in gaging position which coincides with the return of the work clamps and part of the dwell of the work clamps. At 360° the gages start down and are withdrawn during rotation of the cam through approximately 22°, denoted at G—D. The cam for producing the vertical and horizontal movement of the work transferring means is shown in Figs. 29 and 30. In Fig. 31, starting at 0° the cam 442 has moved the work transferring means almost to the top of its stroke which occurs at H just prior to the beginning of the inward movement of the work clamps. From H to I, an angular rotation of approximately 91°, the cam causes the transferring means to descend toward the uniting rolls where it dwells for approximately 7° of rotation, denoted I—J. This dwell provides time for the leading end of the work which has emerged from the uniting rolls to enter the jaws of the transferring means 374 (Fig. 15). Beginning at J, the transferring means ascends from J to H through approximately 262° of rotation of the cam. During the descent of the transferring means, its dwell, and a part of its ascent, the jaws of the transferring means occupy the position shown in Fig. 15 where it is just beginning its horizontal movement O—L to the left. At the point marked L (Fig. 30) during the ascent of the transferring means, which occurs at approximately one-fifth of its upward movement, the cam 442 begins to move the transferring means to the left and completes this movement during the next 40° of rotation, thereby forcing the forming plate away from the retainer bar to admit the work, the forked portion 460 at this time holding the work against the forming plate. The transferring means remains in its extreme left-hand position, as illustrated in Fig. 19, from M to N, a cam rotation of 114°, and then begins to return to the right near the top of its ascent. This allows the forming plate to return toward the retainer bar and grip the work so that further upward movement of the transferring means slips the jaws from the end of the work. The completion of the movement of the right is made in approximately 40° of rotation from N to O, thereby completing the cycle of movement.

In operation, the machine is started by throwing the belt shifter 514 to the left to connect the fixed pulley to the source of power and the machine is allowed to operate continuously. The operator places a stack of tongues on the bench at the right-hand end of the machine and a stack of linings on the left-hand end, then, as the gaging members 46 48 rise to their gaging position, the operator quickly places a tongue and lining on each of the tables 10 and 12 against the gages. Immediately thereafter the work clamps grip the tongue and lining, the gages disappear from the surfaces of the tables and the work is moved inwardly toward the uniting rolls 18 and 20. Adhesive is applied to the lower surface of the tongue and the tongue and lining are pressed into engagement by the uniting rolls 18 and 20 and delivered at the upper side of the rolls to the transferring mechanism 374 which drags the tongue assembly up between the forming plate and the retainer bar. When a sufficient number of pieces have been assembled and disposed in the work holder, the operator then stops the machine and places a string or elastic band about the work and removes it as a bundle from the machine. The speed of the machine is such that the operator is not unduly hurried in placing the work upon the tables and gaging the same, and therefore the work may be disposed in the proper position without too much care on the part of the operator. In fact, after a little experience an operator may become so proficient that the work may be done almost automatically. Very few adjustments are necessary for the proper operation of the machine, the only important adjustments being to adjust the proximity of the pick-up roll with the applying roll, the pressure between the uniting rolls 18 and 20, and the friction between the spring 488 and the parallel bars 470 of the work holding means.

Having described our invention, what we claim as new and desire to secure by Letters Patent of the United States is:

1. In a machine for assembling a tongue and lining, means for adhesively uniting said tongue and lining, work tables at opposite sides of said uniting means, gages above said tables for positioning the tongue and lining, means for moving the tongue and lining along said tables toward the uniting means, and means for withdrawing said gages from the tables prior to the movement of said last-named means.

2. In a machine for assembling a tongue and lining, means for adhesively uniting said tongue and lining, work tables at opposite sides of said uniting means, gage pins projecting from said tables, work clamps movable along said tables, means for closing said work clamps on the work and simultaneously withdrawing the gages from the tables, and means for moving said work clamps longitudinally of the tables toward the uniting means.

3. In a machine for assembling a tongue and lining, means for adhesively uniting said tongue and lining, work tables, openings in said tables, gage pins, and means beneath said tables for supporting said gage pins with their upper ends extending through said openings, said means being operable intermittently to lower said gage pins so that their upper ends are below the surfaces of said tables.

4. In a machine for assembling a tongue and lining, means for adhesively uniting said tongue and lining, work tables, gage pins for locating the work on said tables, work clamps for moving the work along the tables toward the uniting means, and means below the tables for supporting said gage pins with their upper ends projecting above the surfaces of the tables, said means being operable to lower the pins below the top surfaces of the tables and substantially simultaneously to close the work clamps on the work.

5. In a machine for assembling a tongue and lining, means for adhesively uniting said tongue and lining, work tables, gages above each of said tables, means for supporting said gages for reciprocal movement toward and away from the surfaces of the tables, and means for adjusting said gages transversely of the tables.

6. In a machine for assembling a tongue and lining, means for adhesively uniting said tongue and lining, work tables, gage pins on said tables, said gage pins being disposed along the length of each table and across an end thereof so as to engage a side and an end of the work, and means for adjusting the gage pins at the end of one of the tables longitudinally of the table.

7. In a machine for assembling a tongue and lining, means for adhesively uniting said tongue and lining, work tables, gages above each of said tables, means including a frame for supporting said gages and having a shoulder at its end, a cover plate overlying said frame adapted to hold the gages on said frame, and means for wedging said gages against each other and said shoulder thereby to lock them in position.

8. In a machine for assembling a tongue and lining, means for adhesively uniting said tongue and lining, work tables, gages above each of said tables, means including a frame for supporting said gages and having a shoulder at its end, bases attached to the lower ends of the gages, said bases being adapted to rest on said frame, spacers between said bases, a cover plate overlying said bases and having slots through which the gages project, said bases being slidable widthwise of the frame, and means for forcing said bases and spacers against each other and against said shoulder thereby to lock the gages in position.

9. In a machine for assembling a tongue and lining, means for adhesively uniting said tongue and lining, work tables, means for positioning the work on the tables, and work clamps for moving the work along the tables toward the uniting means, said work clamps comprising jaws above and below the tables, said jaws being operable to close upon the work, and means for moving said closed work clamps lengthwise of the tables.

10. In a machine for assembling a tongue and lining, means for adhesively uniting said tongue and lining, work tables, means for positioning the work on the tables, work clamps for moving the work along the tables toward the uniting means, said work clamps comprising upper and lower jaws, said upper jaws being positioned above the surfaces of the tables and said lower jaws being positioned below the surfaces of the tables, slots in said tables through which the lower jaws protect to a point substantially level with the top surfaces thereof, means for closing the upper jaws upon the lower jaws to grip the work, and means for moving the work clamps longitudinally of the tables.

11. In a machine for assembling a tongue and lining, means for adhesively uniting said tongue and lining, work tables upon which the component pieces may be positioned, means comprising work feeding jaws for presenting said pieces to said uniting means, said jaws including lower jaws which are mounted for sliding movement at the level of the tables, and upper jaws movable to clamp the work pieces against the lower jaws and bodily to present the pieces to the uniting means, and a rib and groove connection between said jaws extending transversely to the direction of bodily movement whereby a work feeding movement imparted to one jaw will be transmitted to the other jaw without interfering with the clamping engagement of said jaws.

12. In a machine for assembling a tongue and lining, means for adhesively uniting said tongue and lining, work tables, means for positioning the work on the tables, members for withdrawing the positioning means below the surfaces of the tables, work clamps consisting of upper and lower jaws for moving the work toward the uniting means, said upper jaws being mounted on said members and said lower jaws being mounted on the tables level with their surfaces, means for moving said members for withdrawing the positioning means from the tables and substantially simultaneously closing the jaws, and means for moving the jaws while closed longitudinally of the tables.

13. In a machine for assembling a tongue and lining, means for adhesively uniting said tongue and lining, work tables, means on said tables for positioning the work, means consisting of upper and lower jaws for moving the work lengthwise of said tables, slots in said tables for the reception of the work positioning means and the lower jaws, means below said tables for supporting said work positioning means with their ends projecting through the slots, said upper jaws being mounted on said supporting means below the tables with their work engaging portions above the tables, means on the under sides of the tables for slidably holding said lower jaws with their work engaging portions projecting through said slots to a point even with the surfaces of the tables, means for lowering said supporting means thereby to withdraw the work positioning means from the tables and substantially simultaneously to bring the upper jaws into contact with the work on the lower jaws, means connecting the upper and lower jaws during their engagement, and means for moving said upper jaws lengthwise of the table while engaging the lower jaws.

14. In a machine for assembling a tongue and lining, means for adhesively uniting said tongue and lining, work tables, work clamps for moving the work longitudinally of the tables, said work clamps consisting of upper and lower jaws, means on said tables for slidably supporting the lower jaws, carriages for supporting said upper jaws independently of the lower jaws, means for moving said carriages relatively to the tables to bring said upper jaws into engagement with the work on the lower jaws and simultaneously to connect the same, and means for moving said carriages longitudinally of the tables.

15. In a machine for assembling a tongue and lining, means for adhesively uniting said tongue and lining, work tables, work clamps for moving the work longitudinally of the tables, said work clamps consisting of upper and lower jaws, means on said tables for slidably supporting the lower jaws, shafts parallel to the tables for slidably supporting said upper jaws, means for moving said shafts to bring the upper jaws into contact with the work on the lower jaws, and means for reciprocating said jaws on said shafts lengthwise of the tables.

16. In a machine for assembling a tongue and lining, means for adhesively uniting said tongue and lining, work tables, work clamps for moving the work longitudinally of the tables, said work clamps consisting of upper and lower jaws, means on said tables for slidably supporting the lower jaws, carriages, parallel shafts for supporting each of said carriages for movement longitudinally of the tables, said upper jaws being mounted on said carriages, means for moving said shafts to bring the upper jaws into engagement with the work on the lower jaws, and means for moving said carriages along said shafts.

17. In a machine for assembling a tongue and lining, means for adhesively uniting said tongue and lining, work tables, work clamps for moving the work longitudinally of the tables, said work clamps consisting of upper and lower jaws, means for supporting each of said jaws, and means for moving one of the supports relative to the other to bring the upper jaws into contact with the work on the lower jaws.

18. In a machine for adhesively uniting a tongue and lining, a pair of rolls for uniting the tongue and lining, movable supports for presenting the work to said rolls, and means for supporting said rolls in co-operating relation, said means being so constructed and arranged that bodily movement of one of the rolls produces an equal bodily movement of the other roll.

19. In a machine for adhesively uniting a tongue and lining, a pair of rolls for uniting the tongue and lining, movable supports for presenting the work to said rolls, and means for supporting said rolls in co-operating relation, said means being so constructed and arranged that movement of one of the rolls laterally produces an equal and opposite lateral movement of the other roll.

20. In a machine for adhesively uniting a tongue and lining, a pair of rolls for uniting the tongue and lining, movable supports on opposite sides of said rolls for presenting the work to said rolls, means for supporting said rolls in co-operating relation for relative movement with respect to each other, and means interconnecting said last-named means, said interconnecting means being operable upon lateral movement of one of the rolls to produce equal and opposite lateral movement of the other roll.

21. In a machine for adhesively uniting a tongue and lining, a pair of rolls for uniting the tongue and lining, movable supports for presenting the work to said rolls, pairs of arms for supporting said rolls in co-operating relation, fulcrums for said arms about which they may be moved, and means for connecting said arms to cause movement of one of the rolls to produce equal and opposite movement of the other roll.

22. In a machine for adhesively uniting a tongue and lining, a pair of rolls for uniting the tongue and lining, movable supports for presenting the work to said rolls, and means for supporting said rolls so that each roll may move relative to the other in an arc about two centers spaced from its axis.

23. In a machine for adhesively uniting a tongue and lining, a pair of rolls for uniting the tongue and lining, movable supports for presenting the work to said rolls, arms supporting said rolls, fulcrums about which said arms may turn thereby to permit lateral movement of the rolls with respect to each other, and means pivoted on said arms for pivotally supporting said rolls on said arms.

24. In a machine for adhesively uniting a tongue and lining, a pair of rolls for uniting the tongue and lining, movable supports for presenting the work to said rolls, arms supporting said rolls, fulcrums about which said arms may turn thereby to permit lateral movement of the rolls with respect to each other, and arms pivoted on said first-named arms for supporting said rolls for movement relative to said first-named arms.

25. In a machine for adhesively uniting a tongue and lining, a pair of rolls for uniting the tongue and lining, movable supports for presenting the work to said rolls, arms for supporting each of said rolls in co-operating relation, fulcrums for said arms about which they may turn, means connecting said arms so that movement of one roll produces a corresponding movement of the other roll, and means for urging said rolls in opposite directions about said fulcrums.

26. In a machine for adhesively uniting a tongue and lining, a pair of rolls for uniting the tongue and lining, movable supports for presenting the work to said rolls, arms for supporting said rolls in co-operating relation, fulcrums for said arms about which they may move, means connecting said arms, and an adjusting device connected between said arms, said adjusting device being operable simultaneously to adjust both rolls relative to each other.

27. In a machine for adhesively uniting a tongue and lining, a pair of rolls for uniting the tongue and lining, arms for supporting said rolls in co-operating relation, fulcrums for said arms about which they may move, an adjusting device on one of said arms and connected to the other of said arms, said device being operable to adjust both rolls relative to each other, and means for adjusting the position of each of the rolls independently on said arms.

28. In an assembling machine including uniting means for adhesively pressing a tongue and lining together, a work holder, means for receiving and gripping said work, and means for reciprocating said last-named means thereby to transfer the work from the uniting means to the work holder.

29. In an assembling machine including means for adhesively uniting a tongue and lining, a work holder, movable supports for presenting the work to said uniting means, means for receiving and gripping said work, and means for reciprocating said last-named means linearly in two directions at right angles to each other thereby to transfer the work from the uniting means to the work holder.

30. In a machine for adhesively uniting a tongue and lining, a pair of rolls for pressing the pieces of work together, jaws arranged at the exit side of the rolls, a work holder, a carriage supporting said jaws for movement between the rolls and the work holder, and a second carriage for supporting said first carriage for movement to and from the holder at right angles to the path of reciprocation of the first carriage.

31. In an assembling machine including means for adhesively uniting a tongue and lining, a work holder, a carriage, means on said carriage for gripping said work, and means for simultaneously reciprocating said carriage in directions at right angles to each other thereby to transfer said work from the uniting means to the work holder.

32. In an assembling machine including means for adhesively uniting a tongue and lining, a work holder consisting of a plate and a retainer bar, a carriage, means on said carriage for gripping the work, means for reciprocating said carriage to transfer the work to the work holder, and means for separating the plate from the retainer bar to admit the work.

33. In a machine for adhesively uniting a tongue and lining, a work holder comprising work grasping members one of which is supported only at one end, work transferring means for dragging a work piece between said grasping members, and means for imparting movement to the transferring means in a direction diagonally of said grasping members in order to separate the members as the work piece is moved between them.

34. In a machine for adhesively uniting a tongue and lining, a work holder comprising a sharply recessed forming plate and a bar co-operating with said plate and engaging a mid portion of the work piece to press it into said recess and thereby to impart to it a transverse curvature, and means for dragging a work piece between said plate and bar and for then dragging other work pieces between those previously positioned and the bar thereby successively to form the work pieces retained within said work holder.

35. In an assembling machine including means for uniting a tongue and lining, work transferring means adapted intermittently to receive the work from the uniting means, a plate, means for moving said transferring means to deposit the work in engagement with the plate, and means for retaining the work in engagement with the plate while the work transferring means moves back to its original position for a subsequent piece of work.

36. In a machine for adhesively uniting a tongue and lining, a work holder having work engaging members, one of said members being movable with respect to the other to vary the capacity of the holder, movable work transferring means for depositing the work between said members, and means associated with said work transferring means and movable therewith to move said one member with respect to the other to increase the capacity of the holder as it deposits work in said holder.

37. In a machine for adhesively uniting a tongue and lining, a work holder, work transferring means for presenting the work to said holder, and means associated with the holder to engage the leading edge of the work thereby to disengage the work from the transferring means.

38. In a machine for adhesively uniting a tongue and lining, a work holder, and work transferring means for presenting the work to said holder, said holder consisting of a plate and a retainer bar between which the work is held in a vertical plane on edge.

39. In a machine for adhesively uniting a tongue and lining, a work holder, means for presenting the work to said holder, said holder consisting of a movable work plate and a fixed retainer bar, and means for yieldably urging said plate toward the retainer bar.

40. In a machine for adhesively uniting a tongue and lining, a work holder, and work transferring means for presenting the work to said holder, said holder consisting of a concave forming plate and a retainer bar between which the work is pressed thereby to impart to it a contour substantially similar to that of the instep of the foot.

41. In a machine for adhesively uniting a tongue and lining, a work holder, means for presenting the work to said holder, said holder consisting of a work plate and a retainer bar, a carriage for supporting one holder part for movement relative to the other, means for yieldably urging them toward each other, and friction producing means for opposing the movement of the carriage relative to one holder part.

42. In a machine for adhesively uniting a tongue and lining, a work holder, transferring means for presenting the work to said holder, said holder consisting of a work plate and a retainer bar, means for yieldably urging said plate toward said retainer bar, and means on said transferring means for forcing said plate away from the retainer bar for the introduction of the work therebetween.

43. In a machine for adhesively uniting a tongue and lining, a work holder, transferring means for presenting the work to said holder, said holder consisting of a work plate and a fixed retainer bar, means for movably supporting said plate relative to the retainer bar, a movable bar, a spring disposed between said last-named means and the plate for yieldably urging said plate toward the retainer bar, friction producing means associated with said movable bar, and means for adjusting the friction producing means to maintain the movable bar unyielding up to a predetermined compression of said spring.

44. In a machine for adhesively uniting a tongue and lining, a work holder, transferring means for presenting the work to said holder, said holder consisting of a work plate and a retainer bar between which the work is disposed, means for yieldably urging said plate toward said retainer bar, means on said transferring means for initially engaging said plate and thereafter engaging the work between said plate and bar, and means for causing said last-named means to move the plate away from the retainer bar for the introduction of the work therebetween and thereafter to withdraw the transferring means thereby to permit the work to be frictionally gripped by the plate and retainer bar.

45. In a machine for adhesively uniting a tongue and lining, a work holder for a stack of work pieces, transferring means for presenting said work to said holder, said holder consisting of a plate and a retainer bar, means for yieldably urging said plate toward said retainer bar, spaced projections on said presenting means adapted to straddle the bar and to press the stack toward the plate, and means for reciprocating said transferring means intermittently to separate the plate from the retainer bar to admit the work.

46. In a machine for adhesively uniting a tongue and lining, a work holder, a transferrer for presenting one at a time successive pieces of the work to said holder, said holder consisting of a work forming plate and a bar movable relative to each other to vary the capacity of the holder and between which the work is accumulated and held at its upper end, and a support below said work holder for maintaining the lower ends of the work in the same plane.

JOSEPH R. IOANNILLI.
PAUL H. DIXON.

CERTIFICATE OF CORRECTION.

Patent No. 2,313,148.  March 9, 1943.

JOSEPH R. IONNILLI, ET AL.

It is hereby certified that error appears in the printed specification of the above numbered patent requiring correction as follows: Page 8, first column, line 46, claim 10, for "protect" read --project--; and that the said Letters Patent should be read with this correction therein that the same may conform to the record of the case in the Patent Office.

Signed and sealed this 27th day of April, A. D. 1943.

(Seal)

Henry Van Arsdale,
Acting Commissioner of Patents.